United States Patent [19]
Kawano et al.

[11] Patent Number: 5,461,516
[45] Date of Patent: Oct. 24, 1995

[54] MULTILAYER FILM STRUCTURE

[75] Inventors: Yoshihiro Kawano, Hachiouji; Takao Yamauchi, Ina; Yoshiaki Sano, Kamiina; Takashi Kasahara, Suwa, all of Japan

[73] Assignee: Olympus Optical Co., Ltd, Tokyo, Japan

[21] Appl. No.: 118,241

[22] Filed: Sep. 9, 1993

[30] Foreign Application Priority Data

Mar. 31, 1993 [JP] Japan ..................... 5-074463

[51] Int. Cl.⁶ ..................... G02B 6/34
[52] U.S. Cl. ..................... 359/890; 385/130
[58] Field of Search ..................... 359/885, 890, 359/891, 896, 227, 358, 886; 385/130, 122; 356/432, 441

[56] References Cited

U.S. PATENT DOCUMENTS

| | | | |
|---|---|---|---|
| 3,499,697 | 3/1970 | Edwards | 359/890 |
| 3,846,152 | 11/1974 | Franz | 359/890 X |
| 3,847,585 | 11/1974 | Chisholm | 359/890 X |
| 3,897,140 | 7/1975 | Tuthill | 359/890 X |
| 4,381,883 | 5/1983 | Yamamoto et al. | 359/588 |
| 4,488,775 | 12/1984 | Yamamoto | 359/588 |
| 5,173,811 | 12/1992 | Gumbs | 359/890 X |
| 5,399,374 | 3/1995 | Sumi et al. | 359/890 X |

FOREIGN PATENT DOCUMENTS 5229935 8/1977 Japan.
5547361 11/1980 Japan.

OTHER PUBLICATIONS

Shiro Fujiwara, Optical Thin Film, Second Edition Oct. 1986.

*Primary Examiner*—Akm E. Ullah
*Attorney, Agent, or Firm*—Cushman, Darby & Cushman

[57] ABSTRACT

A multilayer film structure includes a light absorption layer and a transparent layer so that a phase in the light absorption layer and a phase in the transparent layer have substantially constant values, irrespective of wavelengths of light transmitted through both the layers.

15 Claims, 12 Drawing Sheets

5,461,516

MULTILAYER FILM STRUCTURE

BACKGROUND OF THE INVENTION

1. Field of the Invention

This invention relates to a multilayer film structure which can be used as a phase plate for phase contrast microscopes, a modulation filter for modulation contrast microscopes, etc.

2. Description of the Related Art

From the past, a multilayer film structure has been known which can be used as a phase plate for phase contrast microscopes, a modulation filter for modulation contrast microscopes, etc. The multilayer film structure of this type needs such properties that:

light transmitted through the multilayer film structure can be controlled to have a desired intensity, detrimental reflecting light is not produced, and the phase difference between light transmitted through the multilayer film structure and light not transmitted can be controlled to a desired value.

In order to secure these properties, it is necessary to meet the following requirements:

(1) The multilayer film structure includes at least light absorption layers and transparent layers.

(2) The transparent layer has the function of an antireflection film for cutting off rays of light reflected by the light absorption layer.

(3) In order to satisfy the phase condition for the antireflection film, a product (nd) of a thickness (d) and a refractive index (n) of the transparent layer sandwiched between the light absorption layers is approximately ¼ a wavelength (λ) of light intended for antireflection.

(4) In order to satisfy the amplitude condition for the antireflection film, the refractive index and absorption coefficient of the light absorption layer have such a relationship that a value R becomes small which is given by $$R=(n-n0)^2+k^2/(n+n0)^2+k^2$$

where no is the refractive index of a substance constituting the transparent layer, n is the refractive index of a substance constituting the absorption layer, and k is the absorption coefficient of the substance constituting the absorption layer.

(5) The phase change of transmitted light caused by the light absorption layer is compensated by the transparent layer.

(6) the phase difference between light transmitted through the multilayer film structure and light not transmitted is brought to a desired value.

For the film structures taking account of requirements (1) to (4), the technologies are known which are disclosed in Japanese Patent Publication Nos. Sho 52-29935 and Sho 55-47361. As for requirements (5) and (6), the technology is known which is set forth in Japanese Patent Preliminary Publication No. Sho 56-8107.

Publication No. 52-29935 uses Ti and Inconel to control the spectral transmittance of the film, but fails to disclose the means of controlling the spectral phase difference and the spectral reflectance thereof. Publication Sho 55-47361 is designed to control the spectral reflectance of the multilayer film structure by alternately building up the transparent layer and the light absorption layer, and uses Ti and Cr for the light absorption layer. This prior art, however, does not disclose the means of controlling the spectral phase difference of the film structure. Further, Publication Sho 56-8107 is constructed to alternately laminate the light absorption layer and the transparent layer so that the antireflection of the light absorption layer is performed, but does not set forth the means of controlling the spectral phase difference.

In short, the multilayer film structures of the prior art so far discussed have no means of bringing the spectral phase difference to a desired value, and are not designed to control the spectral phase difference, spectral transmittance, and spectral reflectance at the same time. Thus, even though the film structure is built to bring the phase difference, transmittance, and reflectance to proper values with respect to a reference wavelength, they will be deviated from the proper values with respect to other wavelengths. Consequently, in the phase contrast microscope, for example, a good image cannot be obtained over the entire visible wavelength region.

On the other hand, it is known that since the multilayer film structure per se is subjected to a stress, which may cause cracks in the film, the combination of substances bringing about compressive and tensile stresses relieves the stress of the entire film to prevent the cracks from being produced (Fujiwara, "Optical Thin Film", Kyoritsu Shuppan K. K.). However, when the number of layers increases and the thickness of the whole film becomes greater, the possibility of stress cracking will be higher. In Publication Sho 55-47361 mentioned above, metallic layers composed of Ti or Cr and transparent layers of $MgF_2$ are built up as the multilayer, so that there is the possibility that cracks are produced.

SUMMARY OF THE INVENTION

It is, therefore, a primary object of the present invention to provide a multilayer film structure in which the spectral phase difference is properly set.

Another object of the present invention is to provide a multilayer film structure in which the spectral phase difference, spectral transmittance, and spectral reflectance are properly set at the same time.

Still another object of the present invention is to provide a multilayer film structure in which the possibility of causing cracks diminishes.

The multilayer film structure according to the present invention includes light absorption layers and transparent layers so that the phases of the transparent layer and the absorption layer have a substantially constant value, irrespective of the wavelengths of light transmitted therethrough.

In the multilayer film structure combining the transparent layers with the absorption layers, when the refractive index and thickness of one transparent layer are represented by nL and dL respectively, the phase of light transmitted through this layer is given by 2πnL dL /λ. Contrary, when the refractive index of the medium of other portion is represented by hi, the phase of light transmitted therethrough becomes 2πn1 dL /λ. Hence, a phase difference L produced here is given by L=2πdL (nL −n1)λ. To make the spectral phase difference constant, the value of the phase difference L must be constant, irrespective of the wavelength λ. In other words, it is required that (nL 31 n1) /λ is constant in the range of wavelengths used.

It is impossible, however, to fulfil such a condition with a single transparent layer. Thus, it follows that the combination with the phase difference produced by the absorption layer keeps the spectral phase difference for the whole multilayer film structure constant. In this case, the dispersion of the refractive index (the difference in refractive index between wavelengths) of the transparent layer is usually low, and the dispersion of the refractive index of the film structure depends practically on that of the absorption layer. As such, it is desirable that a substance having a dispersion of the refractive index that is relatively great be chosen for use as the absorption layer. Specifically, it is preferable that substances, such as Ti, Ni, and Ag, are used to correct the value of the phase difference between wavelengths.

In order to properly control the spectral phase difference, spectral transmittance, and spectral reflectance at the same time, it is necessary to consider the spectral transmittance and the spectral reflectance in addition to the foregoing. In this case, the multilayer film structure is built to have at least two light absorption layers and at least two transparent layers, and to include at least one kind of metal as a substance constituting the light absorption layer. Here, for the light absorption layer, it Is desirable that use is made of such a substance that the values of the spectral absorption coefficients of the substance are smaller on the short wavelength side and larger on the long wavelength side.

The color temperature of the light source of the microscope is 1000–2800° K, so that the image is reddish and hard to observe. For this reason, in an ordinary observation (bright-field microscope), a color temperature correcting filter is used to convert the color temperature to about 3000–5500° K. The use of the color temperature correcting filler in the phase contrast microscope decreases the amount of light because of the reflection of light at the filter surface, and makes it liable to darken the image and to reduce the contrast. If, therefore, the micro scopes phase film Is designed to also serve as the color temperature correcting filter by increasing the spectral transmittance of the phase film on the short wavelength side, the microscope can be used without the filler. This is effective because such a structure allows for a brighter image.

In the phase film, since the transmittance thereof depends largely on the spectral absorption coefficient of the metal used in the absorption layer, the above condition is satisfied by the choice of metallic substances. Specifically, the use of Ti is favorable because Ti has a smaller absorption coefficient on the short wavelength side than does Cr. The spectral absorption coefficient of a substance, such as Ni, Ag, Pt, etc., also become smaller on the short wavelength side compared with the long wavelength side. This is favorable for the phase film to have the effect of color temperature correction. Also, in the phase film, it is desirable that the spectral phase difference between light transmitted through the film structure and light transmitted through other portions is nearly 90° over the whole range of the visible region. Where the phase modulation is not performed, it is desirable that this spectral phase difference is nearly 0° over the whole range of the visible region.

On the other hand, for prevention of crack production in the multilayer film structure, when the number of layers constituting the multilayer film structure is taken as M, which is even, one of $[(M/2)\pm n]$-th layers [where n=0, 1, 2, ..., $\{(M/2)-2\}$] is formed of $SiO_2$. When the number of layers M is odd, one of $[\{(M+1)/2\}\pm n]$-th layers [where n=0, 1, 2, ..., $\{[(M+1)/2]-2\}$] is formed of $SiO_2$. In this case, it is favorable that at least one dielectric layer is formed of cryolite.

If the multilayer film for antireflection in which the spectral transmittance is uniform is designed by making use of Ti and Inconel, the film will have the structure that the dielectric layer of low refractive index and the metallic layer are alternately laminated. In particular, the multilayer film composed of seven or more layers has favorable characteristics. In this instance, $MgF_2$ is often used for the dielectric layer. Since $MgF_2$, as shown in FIG. 1, has a large film stress, it is liable to produce cracks in the film when the whole film is designed having a large thickness. Thus, the use of $SiO_2$ which minimizes the production of the film stress, as shown in FIG. 1, allows the film stress of $MgF_2$ to be offset.

If, however, this case is applied to the phase film with a phase difference of (¼) as shown in FIG. 2, the phase difference between a ray of light A emerging from the film and another ray of light B traversing a bonding agent must be made (¼) If, therefore, $MgF_2$ is replaced by $SiO_2$, the difference in refractive index between the film and the bonding agent is reduced, with a resultant thicker film. Thus, as mentioned above, when the total number of layers M is even, one of $[(M/2)\pm n]$-th layers [where n=0, 1, 2, ..., $\{(M/2)-2\}$] is formed of $SiO_2$, and when the total number of layers M is odd, one of $[\{(M+1)/2\}\pm n]$-th layers [where n=0, 1, 2, ..., $\{[(M+1)/2]-2\}$] is formed of $SiO_2$. In this way, the multilayer film can be obtained in which the stress caused by $MgF_2$ in the first half of the film can be offset at the center of the film, and the whole film is of moderate thickness and easy to make.

Cryolite ($Na_3AlF_6$), although it has the problem of possessing deliquescence because Na is contained in its molecule, is much less in stress than $MgF_2$ (refer to FIG. 1). Thus, if at least one dielectric layer is made up of cryolite, the production of cracks is more difficult as compared with the film using $MgF_2$, even though the total film thickness or the number of layers Is Increased. Where cryolite is employed for the phase film, It is favorable that the film is structured so that the entire film is sandwiched between the glass plates by the use of the bonding agent to prevent water from penetrating into the film.

Here, In the multilayer film structure according to the present invention, where it is intended that the spectral phase difference and the spectral transmittance are set to their optimum values by correcting the spectral reflectance on one side of a phase control film contained in the film structure, at least two light absorption layers and at least two transparent layers are required. Specifically, in order to control the spectral transmittance and the spectral reflectance on one side, it is required that the entire film be constructed so that the transparent layer is placed between the two light absorption layers and the reflection from the metallic layer can be offset. In order to control the phase difference of light, on the other hand, the entire film requires another transparent layer in addition to the above, namely, two transparent layers, so that the phase difference can be adjusted. For this purpose, at least one kind of metal is used as the light absorption substance, and two or more light absorption layers and two or more transparent layers are arranged. In this way, it is possible, as expected, to control the spectral phase difference, the spectral transmittance, and the spectral reflectance on one side. At this time, two metallic layers control the spectral transmittance, one transparent layer between the two metallic layers performs the function of preventing reflection, and the other transparent layer controls the spectral phase difference to about 90°. The desired performance is thus secured.

In this case, the film structure, as shown In FIG. 3, for instance, is built so that, with respect to a predetermined bonding surface 11a of a glass substrate or a lens 11 provided on one side on which the phase control film is formed, a phase control film 12 in the present invention is configured and, through a bonding agent 13, a glass substrate or a lens 14 provided on the other side on which the phase control film is not formed is bonded. The spectral phase difference in the foregoing indicates the difference in spectral phase between the ray A transmitted through the phase control film 12 and the ray B transmitted through the bonding agent 13 except for the portion corresponding to the phase control film 12.

When Ni or Ti is used as the light absorption substance, the spectral phase difference can be set to approximately 90° in the whole range of the visible region. By choosing and using the substance, such as Ni or Ti, in which the values of the spectral absorption coefficients are smaller for the short wavelength side and larger on the long wavelength side, the spectral phase difference at each wavelength can be reduced to about 90° in the phase control film with a spectral transmittance of about 15%. Since, for example, Ag is also a substance in which the value of the spectral absorption coefficient is small on the short wavelength side and the refractive index is very low, the spectral phase difference at each wavelength can be likewise reduced.

The characteristic of the spectral phase difference described here depends largely upon the gradient of the spectral absorption coefficient in the light absorption substance. Where the optimum performance is found, two or more kinds of metals of different optical constants are mixed for use, or different light absorption substances are used for individual layers. Thus, for the spectral absorption coefficient and spectral refractive index of the light absorption substance, optical constants different from those of the metal of this kind can be set. This is very advantageous to optical design.

The metals for the light absorption substances in the phase control film, including the above-mentioned metals, are available in Ni, Ti, Cr, Ag, Pt, and Al, followed by nickel-chromium (an alloy of Ni and Cr) and Inconel (an alloy of Ni, Cr, and Fe). These metallic layers are used as the light absorption layers in such a manner as described above, and the following performance is obtained thereby.

For Ni and Ti, the light absorption layer can be configured in such a manner that the spectral transmittance of blue light Is slightly high. Similarly, for Cr, the light absorption layer can be configured in such a manner that the spectral transmittance of red light is slightly high. Using these alloys, the values of the spectral absorption coefficient and the spectral refractive index in the alloyed metallic layer obtained in accordance with the contents of Ni, Cr, and Fe as row materials change with wavelengths. Consequently, the spectral transmittance in the light absorption layer to be formed can be set to various optical constants of the average value of the above description and others. In this case, the gradient of the value of the spectral absorption coefficient depending on wavelength will greatly control the value of the spectral absorption coefficient of the phase control film.

As for Ag, Pt, and Al, the refractive index of light is so low that it is hardly necessary to make the transparent layer relatively thick to provide the spectral phase difference. This makes it possible to optically design the phase control film with the smallest possible thickness. The fact that the total film thickness can be made relatively small means that the internal stress caused by coating substances in the layers is held to a minimum level and a film structure that is hard to crack can be formed.

Where the metal is used for the light absorption layer, it is possible to take the average value of the optical constants of the metal and its metal oxide in accordance with the amount of oxidation of the metal used. In this way, the amount of oxidation of the metal used for the light absorption layer is controlled, thereby enabling the optimum phase control film to be formed.

Where the phase control film is configured as a double-face antireflection structure, it is important that the total number of layers of the film structure is made odd and the constituent substances of individual layers of the film are placed symmetrical with respect to the entrance and exit faces, for example, in a glass substrate-$MgF_2$—Ti—$MgF_2$—Ti—$MgF_2$-bonding agent structure. In this case, at least two metallic layers (corresponding to Ti) and at least three transparent layers (corresponding to $MgF_2$) are required. When the film structure is thus built symmetrical with respect to the entrance and exit faces, a double-face antireflection effect is brought about with great ease. Even though the light ray is incident from either face, the image will be free from a flare and substantially the same optical property can be provided.

In the case where the metallic layer is employed as the light absorption layer in particular, if it is brought into direct contact with the glass substrate or the bonding agent, this metallic layer might be oxidized to cause the deterioration of performance. Hence, such a structure is not usually applied. In view of its performance, however, the glass substrate is coated directly with the metallic layer, and thereby the amount of the phase difference may be optimized. Similarly, even when the metallic layer is in contact with the bonding agent, the amount of the phase difference may be optimized. In these cases, when a chemically stabilized metal difficult to oxidize, such as Ni, is used as the metallic layer, the metal is hardly affected by the glass substrate and the bonding agent, thus preventing the deterioration of performance.

Where Ni is used for the metallic layer to design the phase control film, the glass substrate is coated directly with the metallic layer, and the film structure is made symmetrical with regard to the entrance and exit faces. This structure is advantageous because good performance is secured. Specifically, if it is intended that the phase control film with a spectral phase difference of nearly 90° and a spectral transmittance of nearly 15% is designed through the use of Ni and $MgF_2$, the optical thickness including the metallic layers and the transparent layer between the metallic layers becomes approximately (¼) of visible light, because the spectral absorption coefficient of N1 used is large and the spectral refractive index is low. Thus, unless each glass substrate is coated directly with the metallic layer, a double-face anti-reflection design will be difficult.

Where the phase control film is designed by applying Ti to the metal layer, there is the necessity for controlling the spectral phase difference through the first or the last transparent layer. That is, for example, if the spectral phase difference is set to about 90°, a thickness d (nm) of the first or the last transparent layer must be determined to satisfy the condition $$100 < d < 350 \text{ (nm)}$$

If a layer having a thickness falling outside these limits is applied to the design of the phase control film with a spectral phase difference of nearly 90° and a spectral transmittance of nearly 15%, it will be difficult to bring about good performance.

Further, if Ag is used for the metallic layer and the phase control film is designed with the metal of Ag only, the antireflection design will be difficult because of its low spectral refractive index. If, therefore, Ni, Ti, or Cr is combined with Ag of the metallic layer, thereby correcting the spectral phase difference, the spectral transmittance, and the spectral reflectance, satisfactory performance will be obtained.

In this case, for the substances of the transparent layers In the phase control film, $MgF_2$, $SiO_2$, and $Na_2 AlF_6$ are most suitable, each of which has the value of the spectral refractive index, given by the following condition, which satisfies a value close to the solution of the amplitude condition in the optical constant of the metallic layer (Ni, Ti, Cr, etc.):

$1.3 < n < 1.5$

It is also possible to coat an air contacting surface with the light absorption layer to make use of the surface of the glass substrate or the lens. When the film is designed so that it is provided in the bonding part of the surface of the glass substrate or the lens, its fabrication accuracy can be improved compared with the use of the surface. Additionally, in view of its optical performance, an Abbe's number of $MgF_2$ is close to that of the bonding agent in regard to the wavelength dispersion of air, and hence it is rather useful to provide the phase control film in the bonding part. Also, for a film with low chemical durability, the above-mentioned structure provides improved durability.

As for the bonding of the phase control film, the use of a bonding agent with the refractive index $n = 1.4 – 1.6$, for instance, provides a simpler structure in view of the design of the phase control film. Here, the bonding agent having the refractive index n below 1.4 rarely exists in the case of resin, while the bonding agent beyond having a refractive under n above 1.6 has the problem of lacking the uniformity of the spectral transmittance.

Where the phase control film is applied to a phase-contrast objective lens for fluorescence or a modulation-contrast objective lens for fluorescence, the bonding agent may produce self-fluorescence. Further, the application to an objective lens for fluorescence, an objective lens for differential interference, or an objective lens for polarization may cause glass strain due to the bonding agent. In order to settle these respects, it is only necessary to use a bonding agent chiefly composed of silicon-based resin or acryl-based resin, thereby minimizing the self-fluorescence and the glass strain. When the amount of phase difference of the phase control film is set to 0°, the modulation of only amplitude becomes possible. In this case, the film can be used as a pupil modulator for modulation contrast (Hofmann).

On the other hand, where the phase control film is applied to a phase contrast microscope, a modulation contrast microscope, or pupil modulation, uniform modulation from the center of the image to the margin thereof needs the Insertion of a modulator in the pupil of the objective lens. Further, even with the pupil of a relay system conjugate with that of the objective lens, its pupil modulation is possible. The phase contrast microscope and the modulation contrast microscope are designed so that an aperture is further provided at the position conjugate with the pupil of the objective lens in an illumination system. If, as shown in FIG. 4, the phase control film is shaped into an annular form, with the optical axis as its center, on the glass substrate, this film can be effectively used as a modulator for phase contrast microscopes. Similarly, if, as shown in FIG. 5, the phase control film is shaped into an symmetrical form with respect to the optical axis, in a portion excluding the optical axis as its center, on the glass substrate, this film can be effectively used as a modulator for modulation contrast microscopes.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
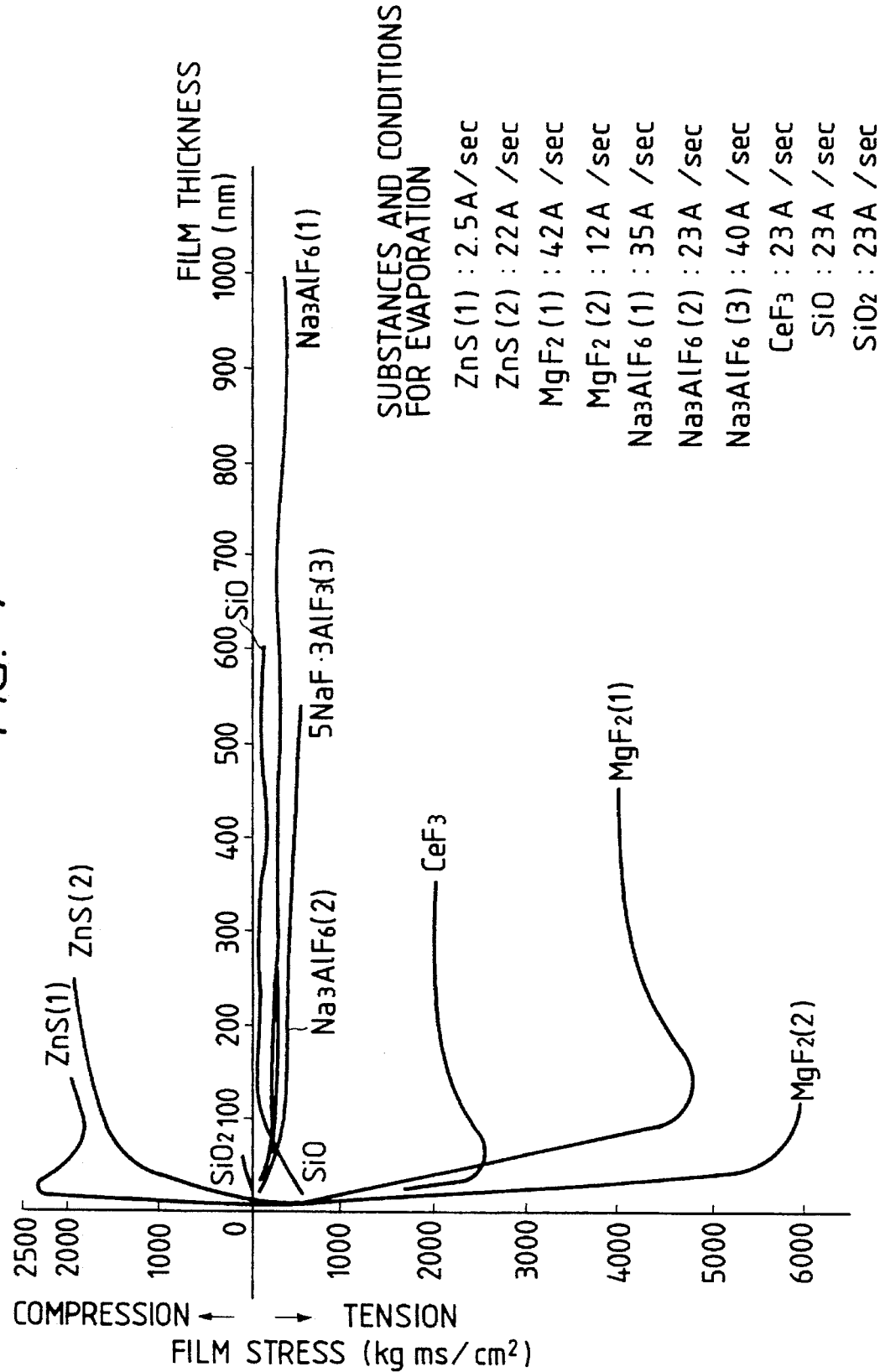
FIG. 1 is a characteristic curve diagram showing film thickness dependence of stress of thin films composed of various substances.
Figure 2:
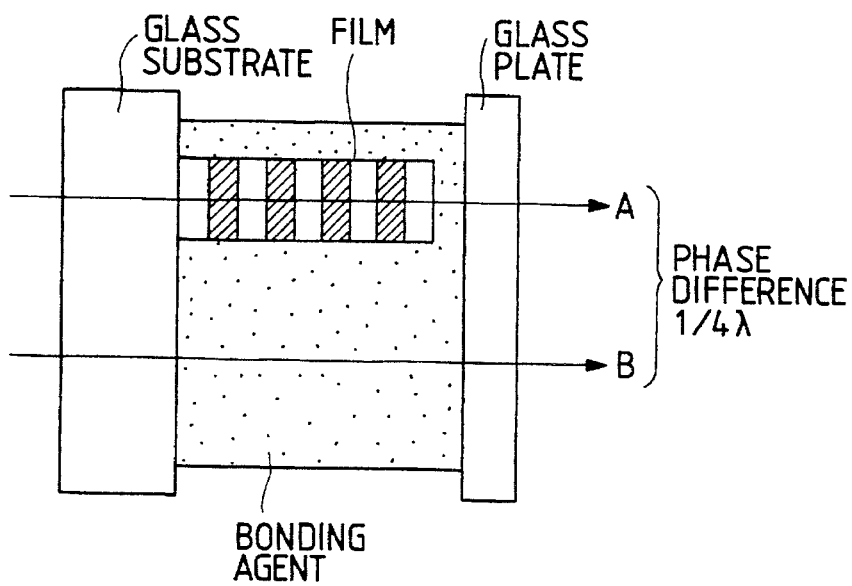
FIG. 2 is a view for explaining a phase film.

The multilayer film structure according to the present invention is capable of controlling the transmittance, reflectance, and phase difference of light. This structure has the light absorption layer and the transparent layer and includes at least one kind of metal to construct the phase control film as a whole and to control the phase difference between light transmitted through the multilayer film structure and light transmitted through other portions.

Referring to the drawings, the embodiments of the present invention will be explained in detail below.

First Embodiment

Figure 3:
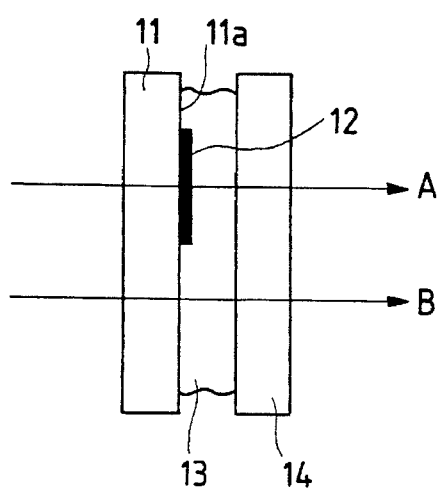
FIG. 3 is a partially sectional view schematically showing a multilayer film structure according to the present invention.
Figure 4:
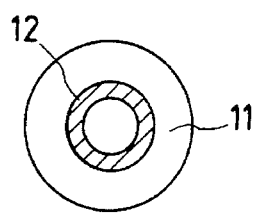
FIGS. 4 and 5 are plan views showing the examples of shapes of the phase control film configured on the glass substrate of the film structure in FIG. 3.
Figure 5:
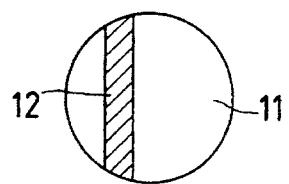

The multilayer film is comprised of nine layers using Ti, $MgF_2$, and $SiO_2$. The whole film is sandwiched between the glass substrate and the glass plate, each having the refractive index n=1.516, through the use of the bonding agent of the refractive index n=1.56 so that the phase difference is (¼)λ (refer to FIG. 3). The following data gives the substance, thickness d, refractive index n, and transmittance T of light with a wavelength λ of 550 nm, relative to the first to ninth layers contiguously built up on the glass substrate.

| Layer | Substance | d | n | T (%) |
|---|---|---|---|---|
| 1 | $MgF_2$ | 286.4 | 1.37914 | |
| 2 | Ti | | | 70.9 |
| 3 | $MgF_2$ | 77.6 | 1.37914 | |
| 4 | Ti | | | 48.9 |
| 5 | $SiO_2$ | 70.9 | 1.46019 | |
| 6 | Ti | | | 48.9 |
| 7 | $MgF_2$ | 77.6 | 1.37914 | |
| 8 | Ti | | | 70.9 |
| 9 | $MgF_2$ | 286.4 | 1.37914 | |

Figure 6:
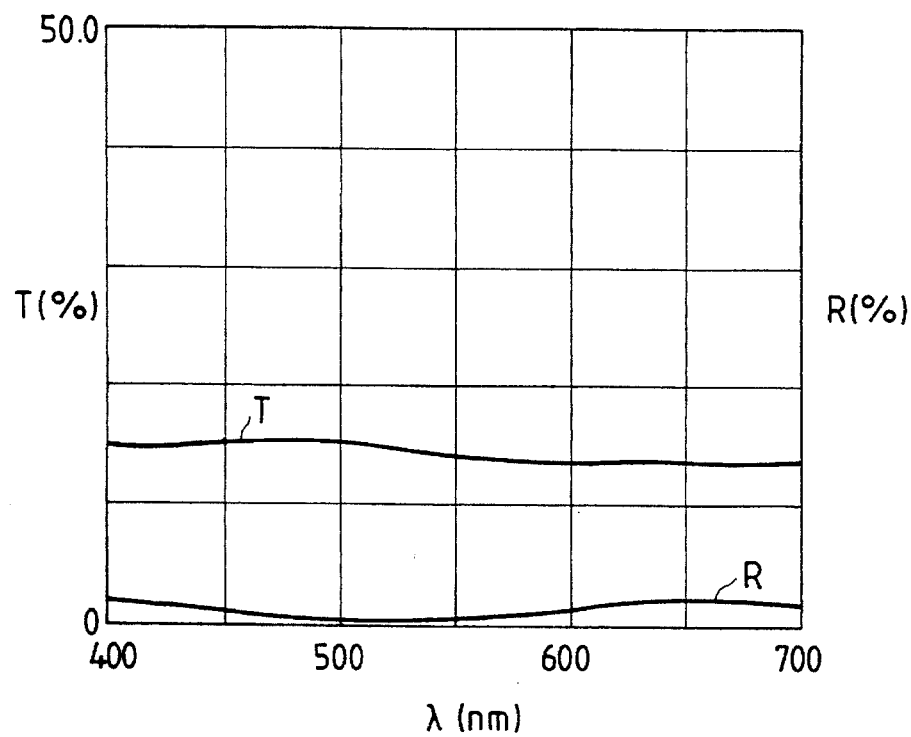
FIGS. 6 to 10 are diagrams showing the spectral characteristics of a multilayer film in first to fifth embodiments according to the present invention.

The multilayer film is fabricated as a double-face antireflection structure by making symmetrical the layer formation on the entrance and exit sides. Also, where the multilayer film with a transmittance of 25% or less is fabricated as the double-face antireflection structure, it is desirable that the film has nine layers or more. The spectral characteristics are as plotted in FIG. 6.

Second Embodiment

The multilayer film is comprised of 11 layers using Ti, $MgF_2$, and $SiO_2$, and the entire film structure is built similar to the first embodiment. For individual layers, the substance, thickness d, refractive index n, and transmittance T are as shown below.

| Layer | Substance | d | n | T (%) |
|---|---|---|---|---|
| 1 | $MgF_2$ | 314.5 | 1.37914 | |
| 2 | Ti | | | 57.7 |
| 3 | $MgF_2$ | 80.3 | 1.37914 | |
| 4 | Ti | | | 31.4 |
| 5 | $SiO_2$ | 81.7 | 1.46019 | |
| 6 | Ti | | | 31.4 |
| 7 | $SiO_2$ | 81.7 | 1.46019 | |
| 8 | Ti | | | 31.4 |
| 9 | $MgF_2$ | 80.3 | 1.37914 | |
| 10 | Ti | | | 57.7 |
| 11 | $MgF_2$ | 314.5 | 1.37914 | |

Figure 7:
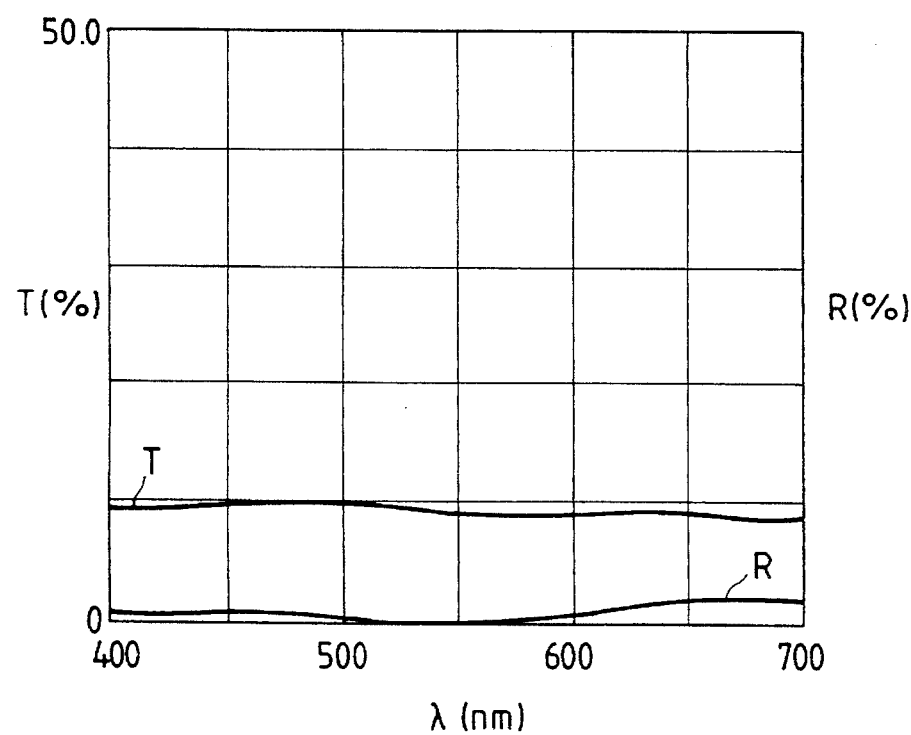

By forming the fifth and seventh layers of $SiO_2$, the property of the multilayer film is improved. Where the transmittance of the multilayer film is set to 15% or less in particular, the total film thickness becomes larger and the film structure of about 11 layers makes the production of cracks difficult. The spectral characteristics are plotted in FIG. 7.

Third Embodiment

The multilayer film is comprised of 11 layers using Inconel and cryolite, and the entire film structure is built similar to the first embodiment. For individual layers, the substance, thickness d, refractive index n, and transmittance T are as shown below.

| Layer | Substance | d | n | T (%) |
|---|---|---|---|---|
| 1 | Cryolite | 224.2 | 1.371 | |
| 2 | Inconel | | | 70.9 |
| 3 | Cryolite | 64.8 | 1.371 | |
| 4 | Inconel | | | 58.4 |
| 5 | Cryolite | 37.4 | 1.371 | |
| 6 | Inconel | | | 58.4 |
| 7 | Cryolite | 37.4 | 1.371 | |
| 8 | Inconel | | | 58.4 |
| 9 | Cryolite | 64.8 | 1.371 | |
| 10 | Inconel | | | 70.9 |
| 11 | Cryolite | 224.2 | 1.371 | |

Figure 8:
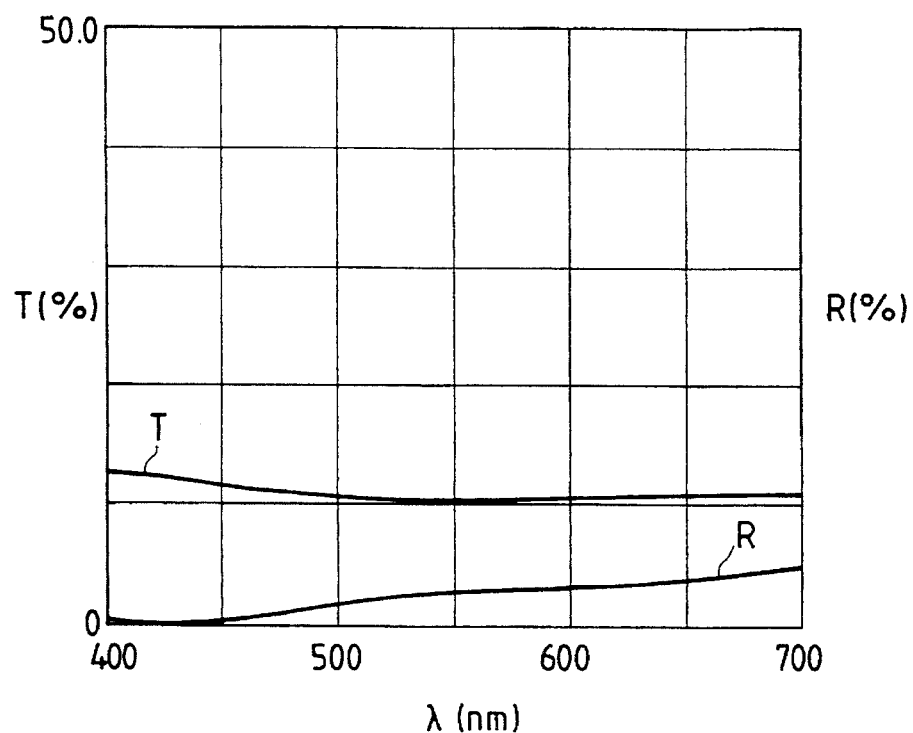

The spectral characteristics are plotted in FIG. 8.

Fourth Embodiment

The multilayer film is comprised of 11 layers using Ti, $MgF_2$, and $SiO_2$. In this embodiment, the substances of the fifth and seventh layers in the second embodiment are replaced with $MgF_2$ and the third and ninth layers with $SiO_2$. For individual layers, the substance, thickness d, refractive index n, and transmittance T are as shown below.

Figure 9:
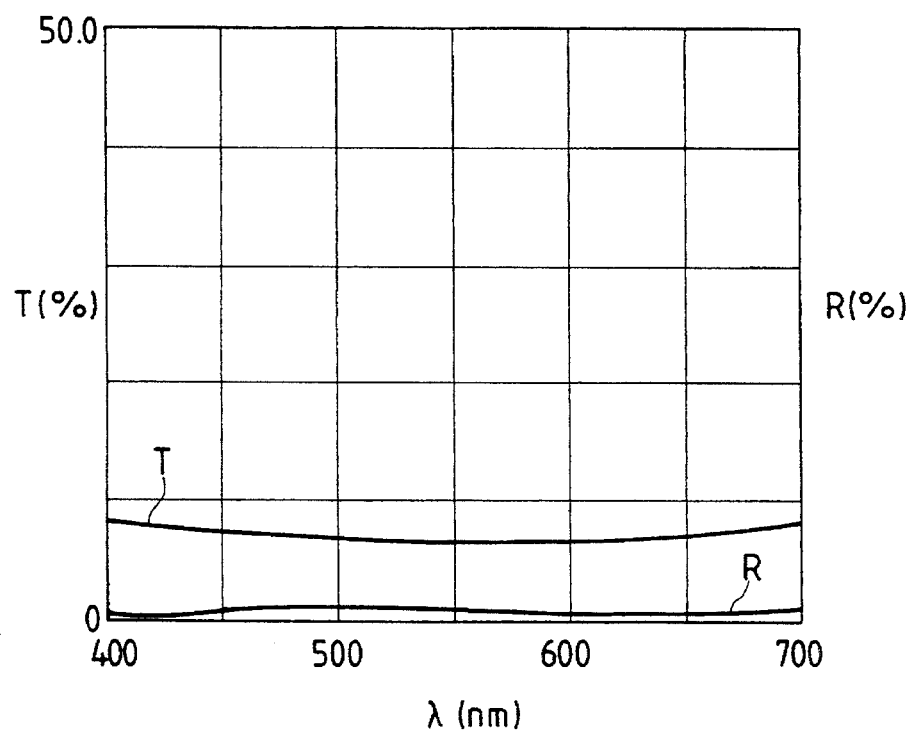

| Layer | Substance | d | n | T (%) |
|---|---|---|---|---|
| 1 | $MgF_2$ | 400.0 | 1.37914 | |
| 2 | Ti | | | 65.9 |
| 3 | $SiO_2$ | 74.9 | 1.46019 | |
| 4 | Ti | | | 47.4 |
| 5 | $MgF_2$ | 93.9 | 1.37914 | |
| 6 | Ti | | | 47.4 |
| 7 | $MgF_2$ | 93.9 | 1.37914 | |
| 8 | Ti | | | 47.4 |
| 9 | $SiO_2$ | 74.9 | 1.46019 | |
| 10 | Ti | | | 65.9 |
| 11 | $MgF_2$ | 400.0 | 1.37914 | |

Where a thicker multilayer film is fabricated, each $SiO_2$ layer is located at the position where the refractive index n is higher, and thereby the stress can be further reduced. The fourth embodiment corresponds to the case where the refractive index is 3. The spectral characteristics are plotted in FIG. 9.

Fifth Embodiment

The multilayer film is comprised of 13 layers using Ti, $MgF_2$, and $SiO_2$. For individual layers, the substance, thickness d, refractive index n, and transmittance T are as shown below.

| Layer | Substance | d | n | T (%) |
|---|---|---|---|---|
| 1 | $MgF_2$ | 250.0 | 1.37914 | |
| 2 | Ti | | | 67.9 |
| 3 | $SiO_2$ | 83.5 | 1.46019 | |
| 4 | Ti | | | 67.9 |
| 5 | $MgF_2$ | 140.8 | 1.37914 | |
| 6 | Ti | | | 67.9 |
| 7 | $MgF_2$ | 87.1 | 1.37914 | |
| 8 | Ti | | | 67.9 |
| 9 | $MgF_2$ | 140.8 | 1.37914 | |
| 10 | Ti | | | 67.9 |
| 11 | $SiO_2$ | 83.5 | 1.46019 | |
| 12 | Ti | | | 67.9 |
| 13 | $MgF_2$ | 250.0 | 1.37914 | |

Figure 10:
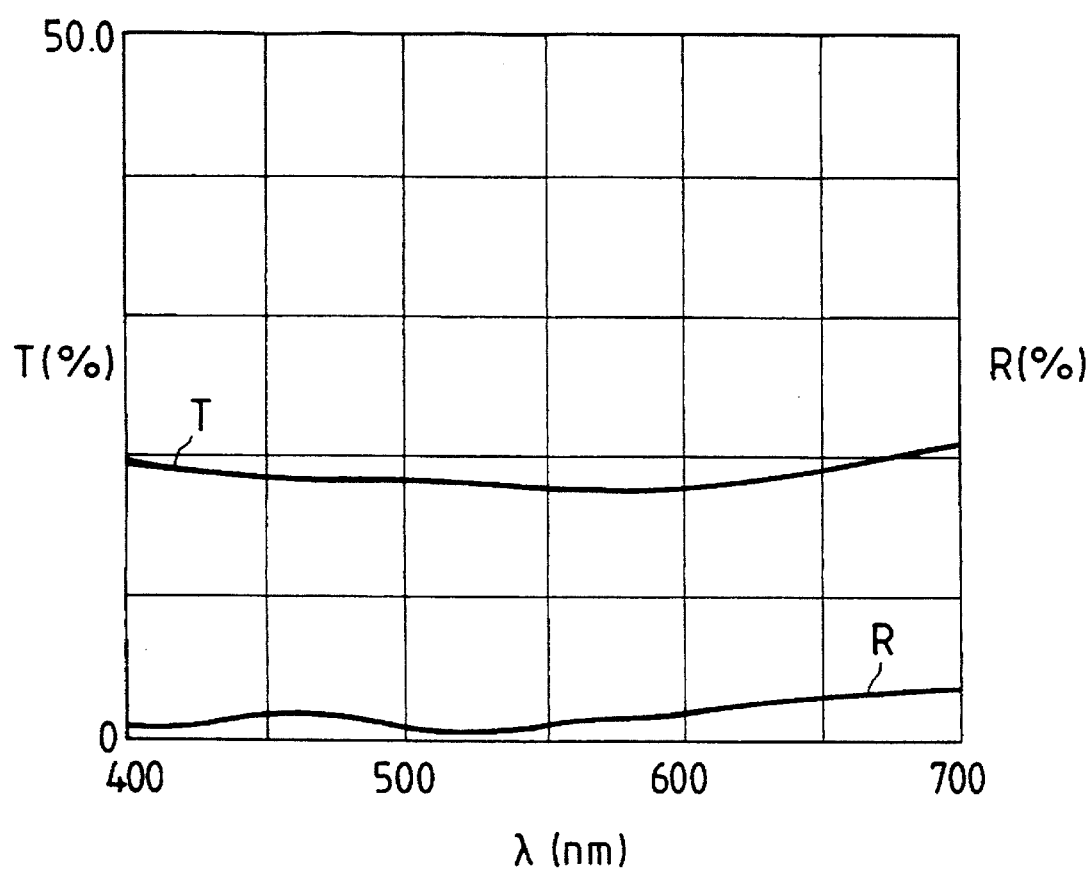

The fifth embodiment is the case where the refractive index n is 4. The spectral characteristics are plotted in FIG. 10.

Sixth Embodiment

This embodiment exemplifies the multilayer film structure for single-face antireflection, provided on the glass substrate (BK7), where the bonding agent with the refractive index n=1.56 is used to alternately build up two light absorption layers (Ti and Inconel) and two transparent layers ($MgF_2$). Ti and Inconel of two different kinds of metals are used for these light absorption layers to control the spectral transmittance. The following data gives the substance, thickness d (nm), and transmittance T of light with a wavelength λ of 550 nm, relative to the second to fifth layers thus built up contiguously on the glass substrate.

| Layer | Substance | d (nm) | T (%) |
|---|---|---|---|
| 1 | BK7 | | |
| 2 | $MgF_2$ | 545.0 | |
| 3 | Ti | | 37 |

-continued

| Layer | Substance | d (nm) | T (%) |
|---|---|---|---|
| 4 | MgF$_2$ | 106.0 | |
| 5 | Inconel | 2.2 | 68 |

Figure 11:
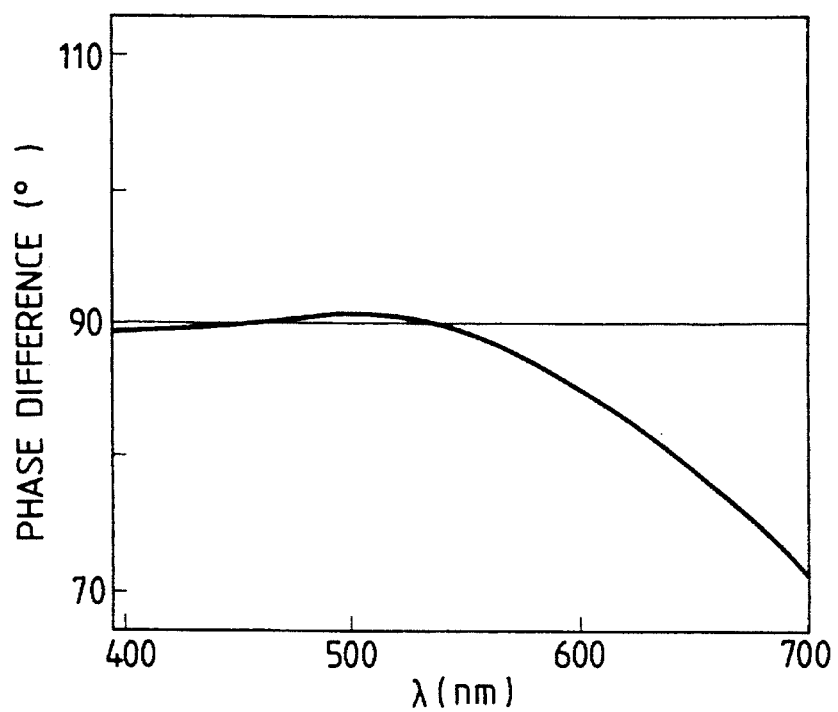
FIGS. 11 and 12; 13 and 14; 15 and 16; 17 and 18; 19 and 20; 21 and 22; and 23 and 24 are diagrams illustrating the spectral phase difference characteristics and the spectral transmittance and spectral reflectance characteristics of the multilayer film structure in sixth to twelfth embodiments, respectively, of the present invention.
Figure 12:
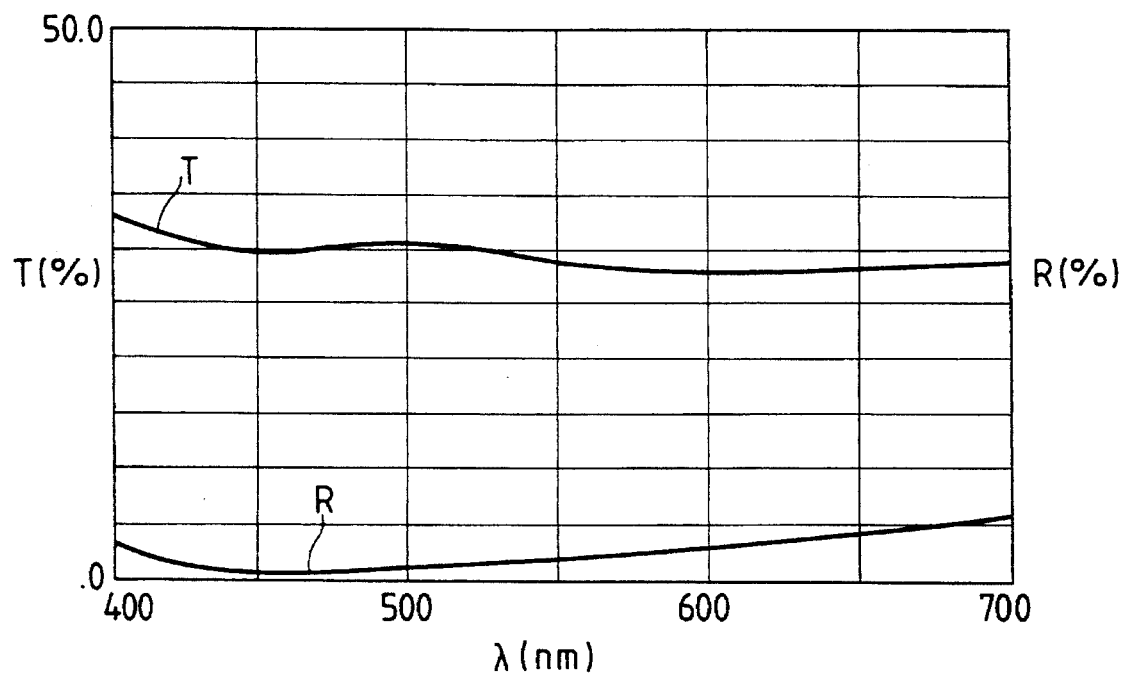

The spectral phase difference characteristic is as shown in FIG. 11, and the characteristics of spectral transmittance (T) and spectral reflectance (R) are as shown in FIG. 12.

Seventh embodiment

This embodiment exemplifies the multilayer film structure for double-face antireflection, provided between the glass substrates (BK7), where the bonding agent with the refractive index n=1.54 is used and the film structure in the sixth embodiment is built symmetrical with respect to the entrance and exit faces. The following data give the substance, thickness d (nm), and transmittance T of light with a wavelength λ of 550 nm, relative to the second to tenth layers thus built up contiguously on the glass substrate.

| Layer | Substance | d (nm) | T (%) |
|---|---|---|---|
| 1 | BK7 | | |
| 2 | MgF$_2$ | 220.4 | |
| 3 | Ti | | 64.5 |
| 4 | MgF$_2$ | 73.9 | |
| 5 | Inconel | | 55.4 |
| 6 | MgF$_2$ | 93.9 | |
| 7 | Inconel | | 55.4 |
| 8 | MgF$_2$ | 73.9 | |
| 9 | Ti | | 64.5 |
| 10 | MgF$_2$ | 220.4 | |
| 11 | BK7 | | |

Figure 13:
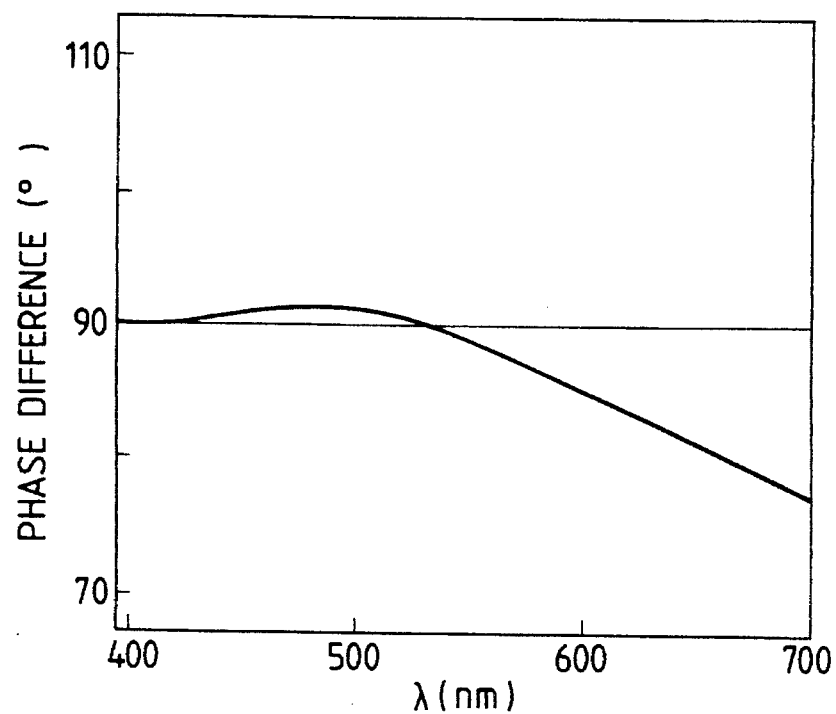
Figure 14:
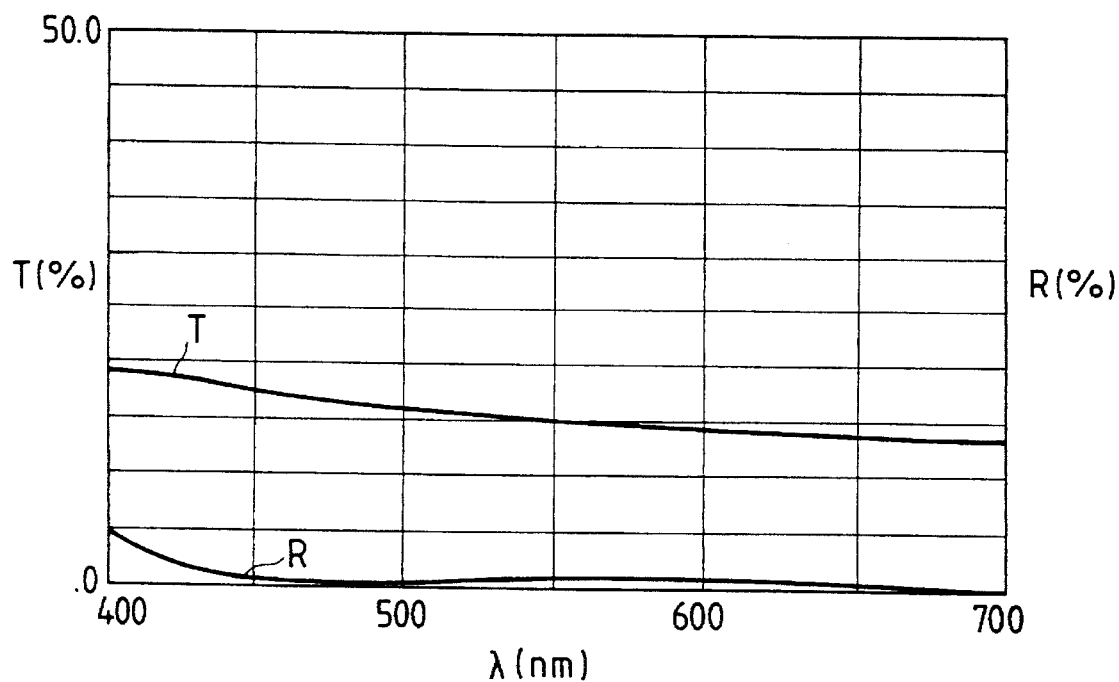

The spectral phase difference characteristic is as shown in FIG. 13, and the characteristics of spectral transmittance (T) and spectral reflectance (R) are as shown in FIG. 14.

Eighth Embodiment

This embodiment illustrates the multilayer film structure for double-face antireflection, provided between the glass substrates (BK7), where the bonding agent with the refractive index n=1.56 is used and Ag and Ti of two kinds of metals are used as the light absorption layers in the sixth embodiment so that the film structure is built symmetrical with respect to the entrance and exit faces. The following data gives the substance, thickness d (nm), and transmittance T of light with a wavelength λ of 550 nm, relative to the second to twelfth layers thus built up contiguously on the glass substrate.

| Layer | Substance | d (nm) | T (%) |
|---|---|---|---|
| 1 | BK7 | | |
| 2 | MgF$_2$ | 180.5 | |
| 3 | Ti | | 67.3 |
| 4 | MgF$_2$ | 95.2 | |
| 5 | Ti | | 57.6 |
| 6 | SiO$_2$ | 58.9 | |
| 7 | Ag | | 86.4 |
| 8 | SiO$_2$ | 58.9 | |
| 9 | Ti | | 57.6 |
| 10 | MgF$_2$ | 95.2 | |
| 11 | Ti | | 67.3 |
| 12 | MgF$_2$ | 180.5 | |
| 13 | BK7 | | |

Figure 15:
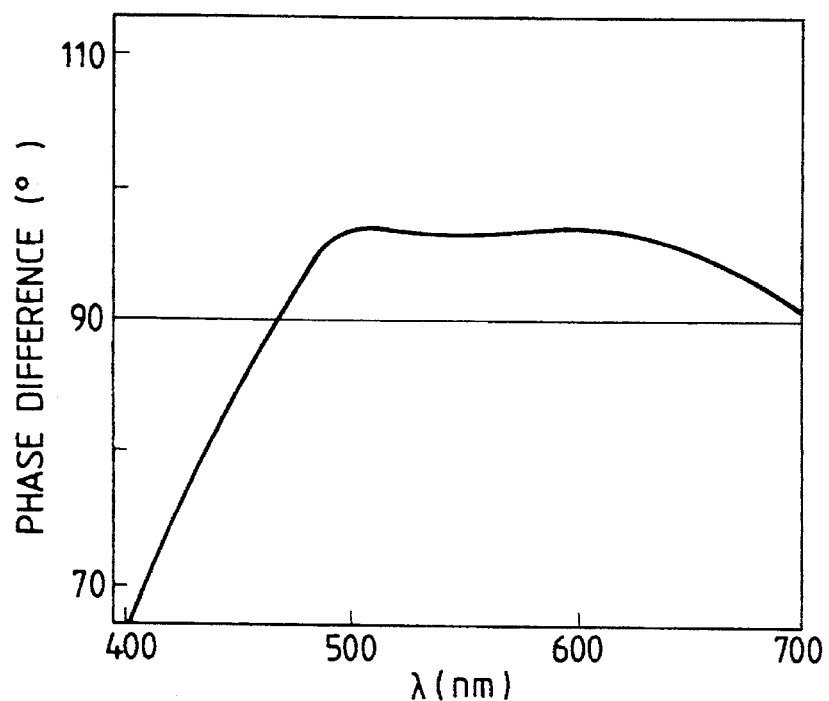
Figure 16:
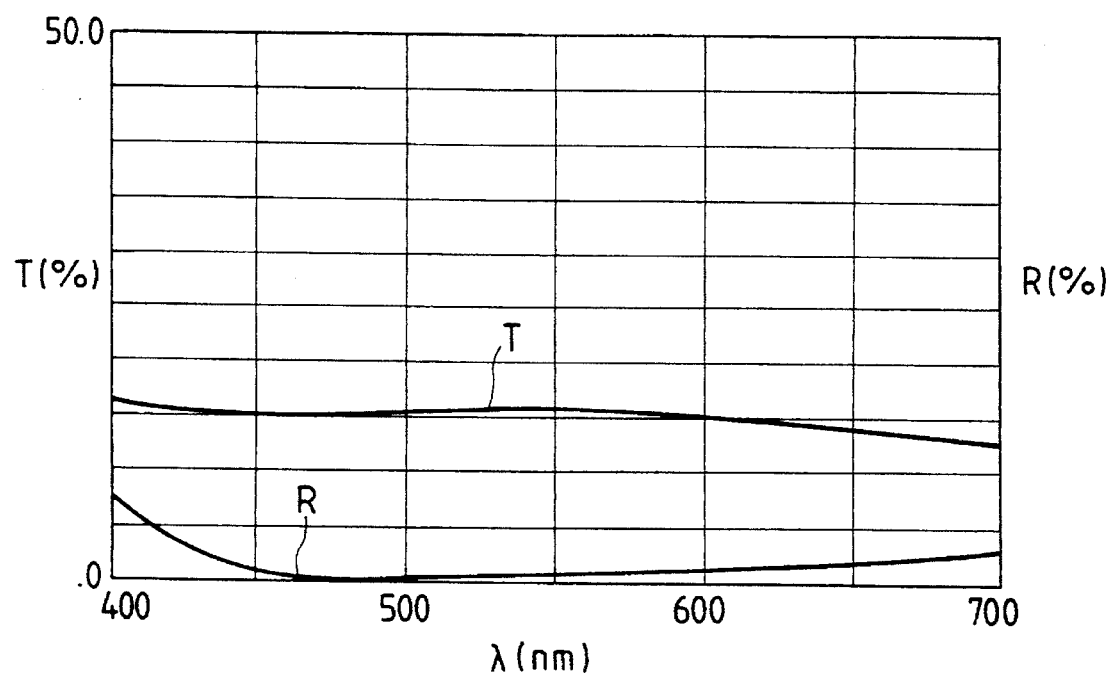

The spectral phase difference characteristic is as shown in FIG. 15, and the characteristics of spectral transmittance (T) and spectral reflectance (R) are as shown in FIG. 16.

Ninth Embodiment

This embodiment illustrates the multilayer film structure for double-face antireflection, provided between the glass substrates (BK7), where the bonding agent with the refractive index n=1.56 is used and Ni of a single kind of metal is used as the light absorption layers in the sixth embodiment so that the film structure is built symmetrical with respect to the entrance and exit faces. The following data gives the substance, thickness d (nm), and transmittance T of light with a wavelength λ of 550 nm, relative to the second to eighth layers thus built up contiguously on the glass substrate.

| Layer | Substance | d (nm) | T (%) |
|---|---|---|---|
| 1 | BK7 | | |
| 2 | Ni | 4.1 | 64.0 |
| 3 | MgF$_2$ | 107.5 | |
| 4 | Ni | 8.6 | 43.0 |
| 5 | MgF$_2$ | 100.8 | |
| 6 | Ni | 8.6 | 43.0 |
| 7 | MgF$_2$ | 107.5 | |
| 8 | Ni | 4.1 | 64.0 |
| 9 | BK7 | | |

Figure 17:
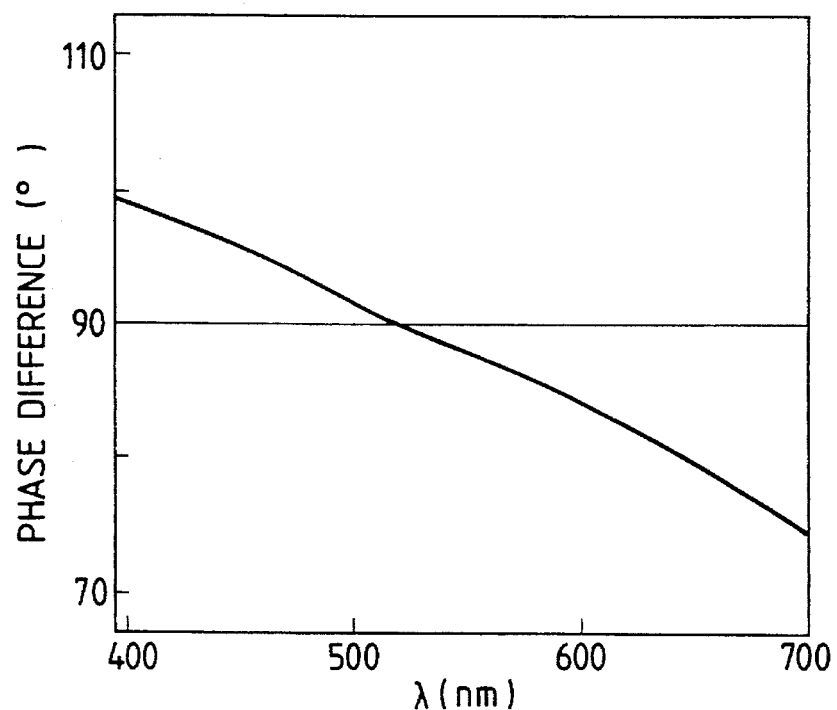
Figure 18:
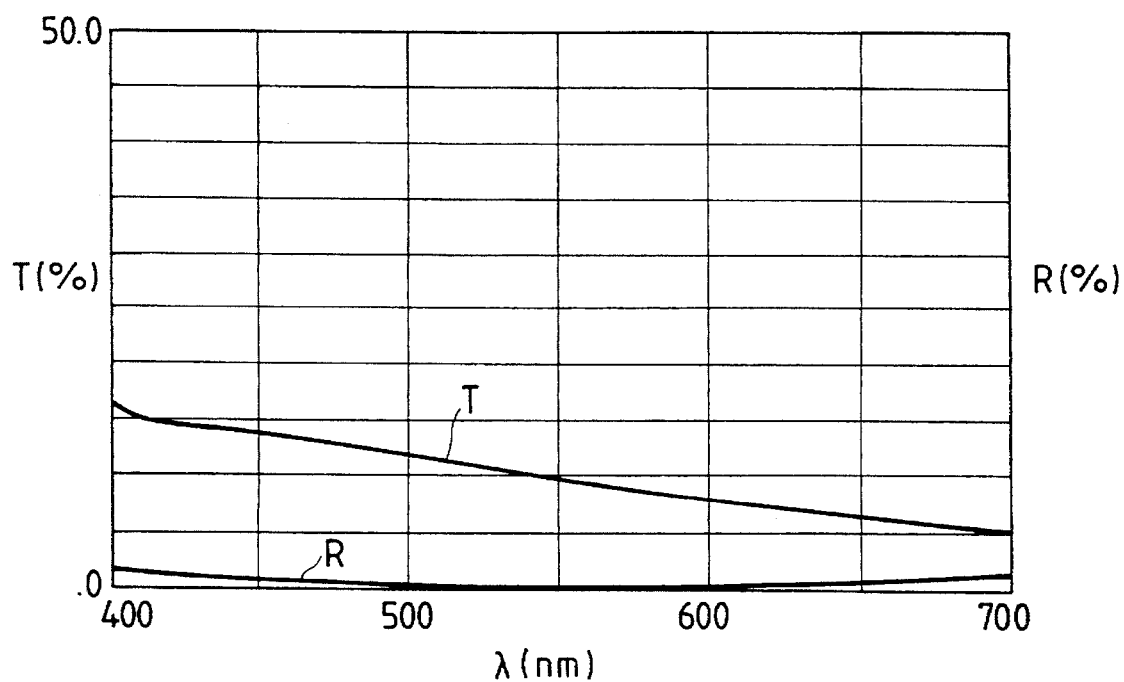

The spectral phase difference characteristic is as shown in FIG. 17, and the characteristics of spectral transmittance (T) and spectral reflectance (R) are as shown in FIG. 18.

Tenth embodiment

This embodiment illustrates the multilayer film structure for double-face antireflection, provided between the glass substrates (BK7), where the bonding agent with the refractive index n=1.56 is used and Pt and Inconel of two kinds of metals are used as the light absorption layers in the sixth embodiment so that the film structure is built symmetrical with respect to the entrance and exit faces. The following data gives the substance, thickness d (nm), and transmittance T of light with a wavelength λ of 550 nm, relative to the second to tenth layers thus built up contiguously on the glass substrate.

| Layer | Substance | d (nm) | T (%) |
|---|---|---|---|
| 1 | BK7 | | |
| 2 | Pt | 3.4 | 71.2 |
| 3 | MgF$_2$ | 111.3 | |
| 4 | Pt | 5.5 | 59.6 |
| 5 | MgF$_2$ | 59.8 | |
| 6 | Inconel | 1.6 | 72.0 |
| 7 | MgF$_2$ | 59.8 | |
| 8 | Pt | 5.5 | 59.6 |
| 9 | MgF$_2$ | 111.3 | |
| 10 | Pt | 3.4 | 71.2 |
| 11 | BK7 | | |

The spectral phase difference characteristic is as shown in

Figure 19:
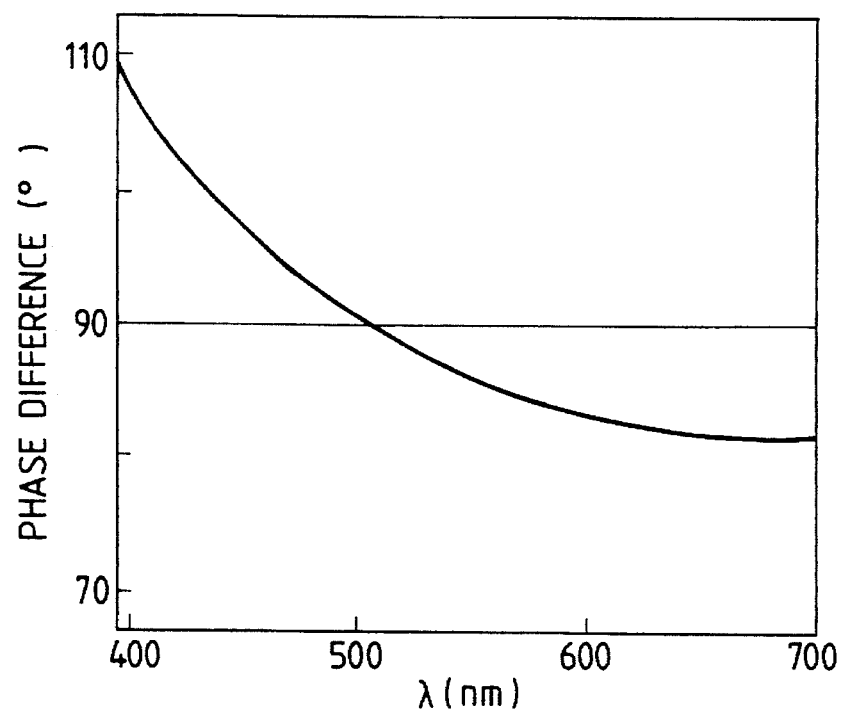
Figure 20:
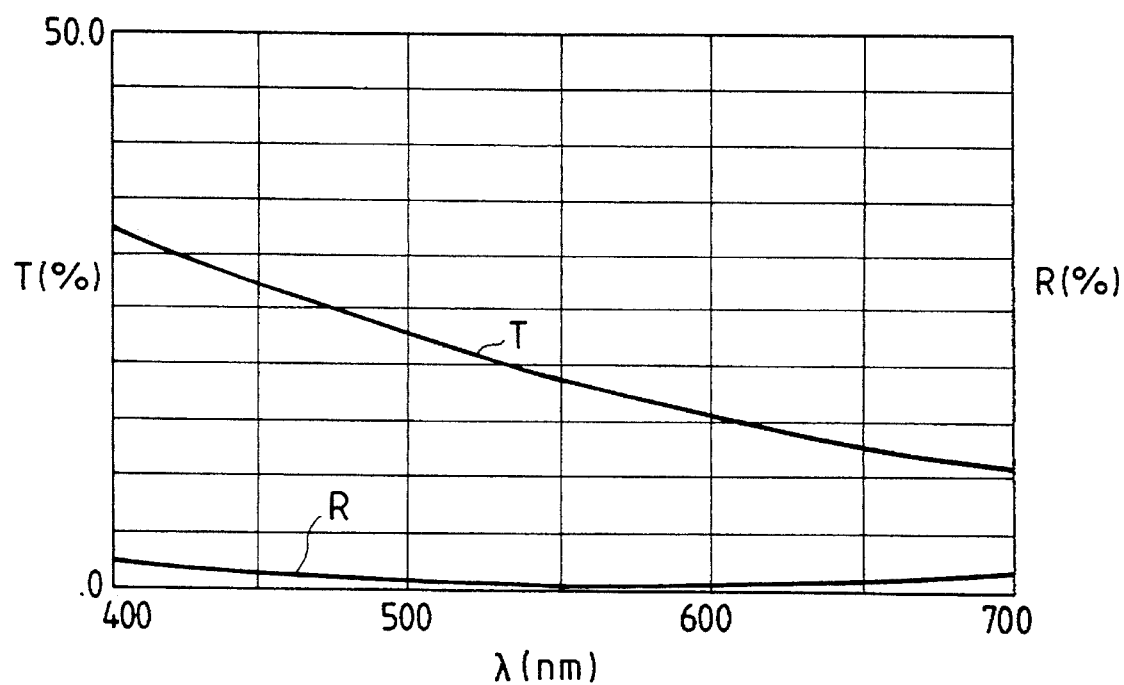

FIG. 19, and the characteristics of spectral transmittance (T) and spectral reflectance (R) are as shown In FIG. 20.

Eleventh Embodiment

This embodiment illustrates the multilayer film structure for double-face antireflection, provided between the glass substrates (BK7), where the bonding agent with the refractive index n=1.56 is used and Pt and Inconel of two kinds of metals are used as the light absorption layers in the sixth embodiment so that the film structure is built symmetrical with respect to the entrance and exit faces. The following data gives the substance, thickness d (nm), and transmittance T of light with a wavelength λ of 550 nm, relative to the second to twelfth layers thus built up contiguously on the glass substrate.

| Layer | Substance | d (nm) | T (%) |
|---|---|---|---|
| 1 | BK7 | | |
| 2 | $MgF_2$ | 163.0 | |
| 3 | Inconel | 2.2 | 66.0 |
| 4 | $MgF_2$ | 55.2 | |
| 5 | Pt | 3.9 | 68.0 |
| 6 | $MgF_2$ | 71.7 | |
| 7 | Inconel | 2.2 | 66.0 |
| 8 | $MgF_2$ | 71.7 | |
| 9 | Pt | 3.9 | 68.0 |
| 10 | $MgF_2$ | 55.2 | |
| 11 | Inconel | 2.2 | 66.0 |
| 12 | $MgF_2$ | 163.0 | |
| 13 | BK7 | | |

Figure 21:
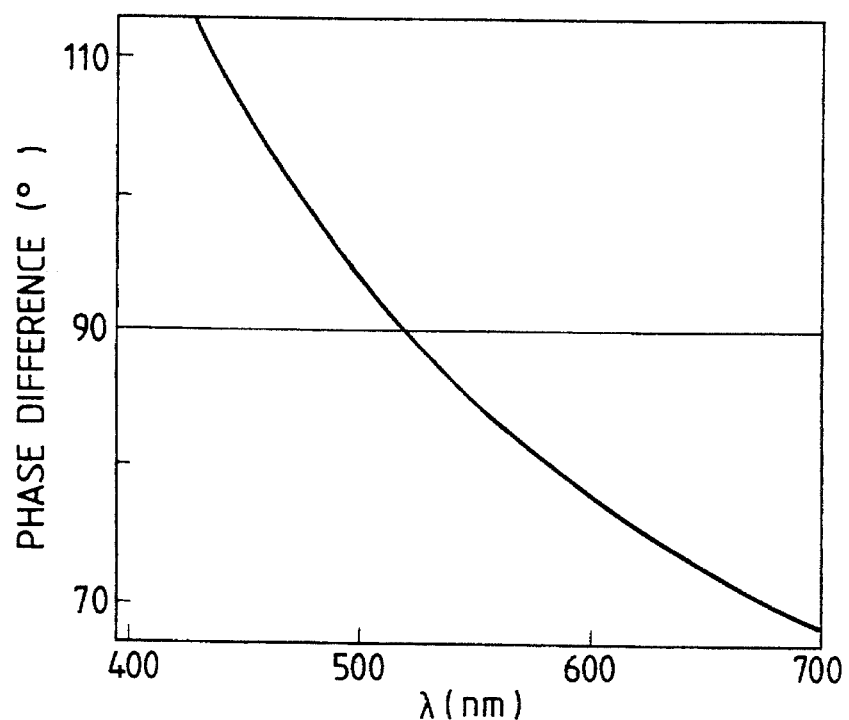
Figure 22:
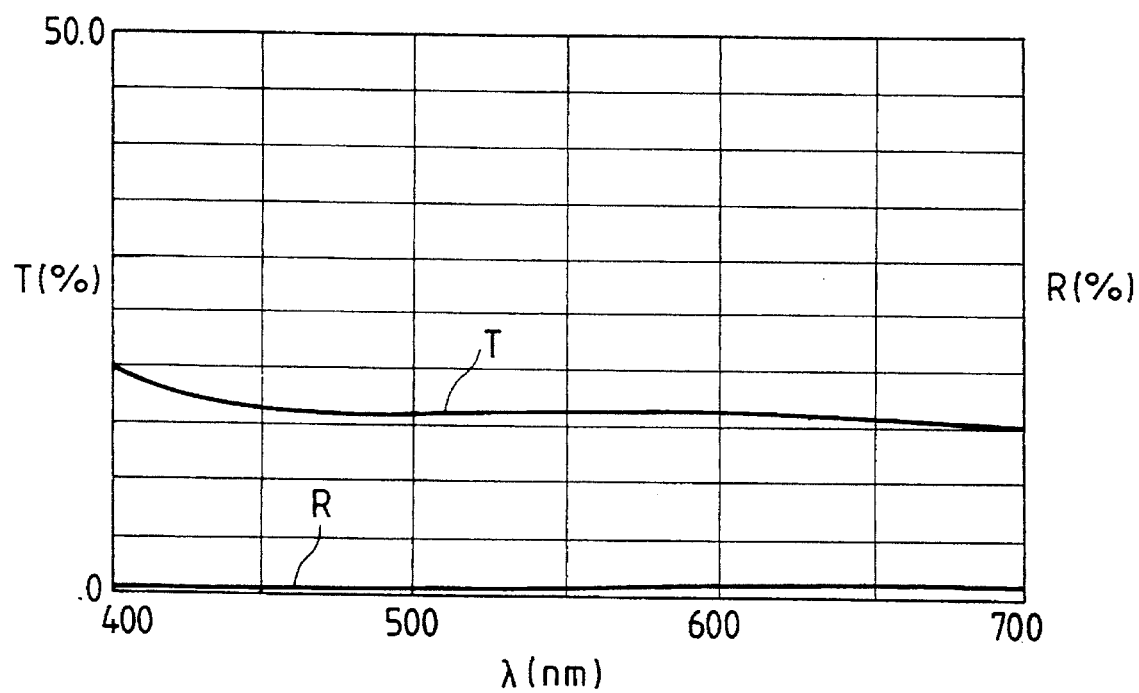

The spectral phase difference characteristic is as shown In FIG. 21, and the characteristics of spectral transmittance (T) and spectral reflectance (R) are as shown in FIG. 22.

Twelfth Embodiment

This embodiment shows the multilayer film structure, provided between the glass substrates (BK7), where the bonding agent with the refractive index n=1.56 is used and $Al_2O_3$ is used as the light absorption layers so that the film structure is built symmetrical with respect to the entrance and exit faces. The following data gives the substance, thickness d (nm), and transmittance T of light with a wavelength λ of 550 nm, relative to the second to twelfth layers.

| Layer | Substance | d (nm) | T (%) |
|---|---|---|---|
| 1 | BK7 | | |
| 2 | $Al_2O_3$ | 330.6 | |
| 3 | Ni | | 71.7 |
| 4 | $Al_2O_3$ | 89.1 | |
| 5 | Ni | | 50.4 |
| 6 | $Al_2O_3$ | 88.1 | |
| 7 | Ni | | 40.2 |
| 8 | $Al_2O_3$ | 88.1 | |
| 9 | Ni | | 50.4 |
| 10 | $Al_2O_3$ | 89.0 | |
| 11 | Ni | | 71.7 |
| 12 | $Al_2O_3$ | 330.6 | |
| 13 | BK7 | | |

Figure 23:
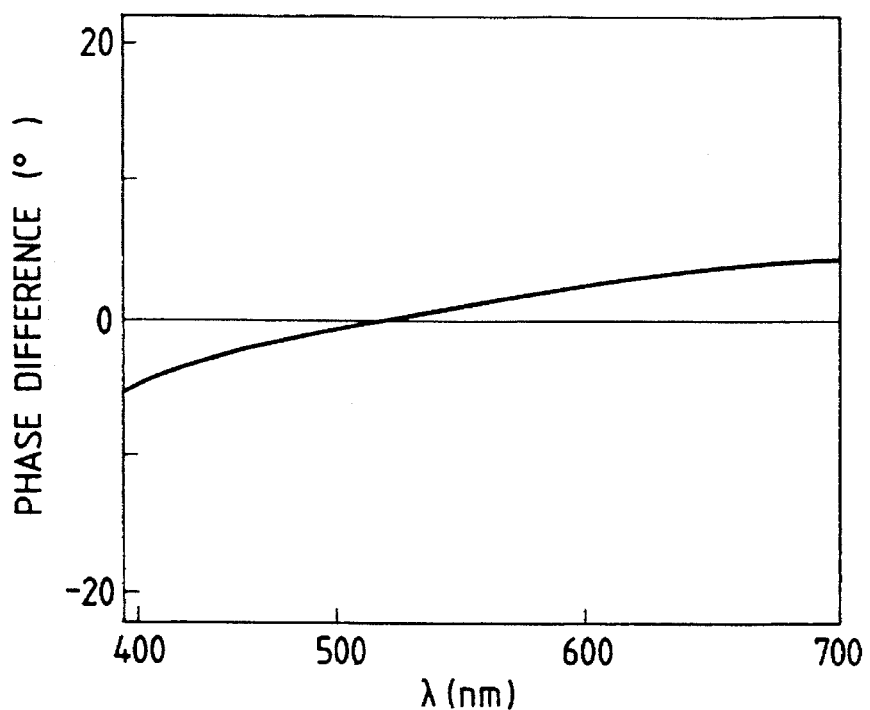
Figure 24:
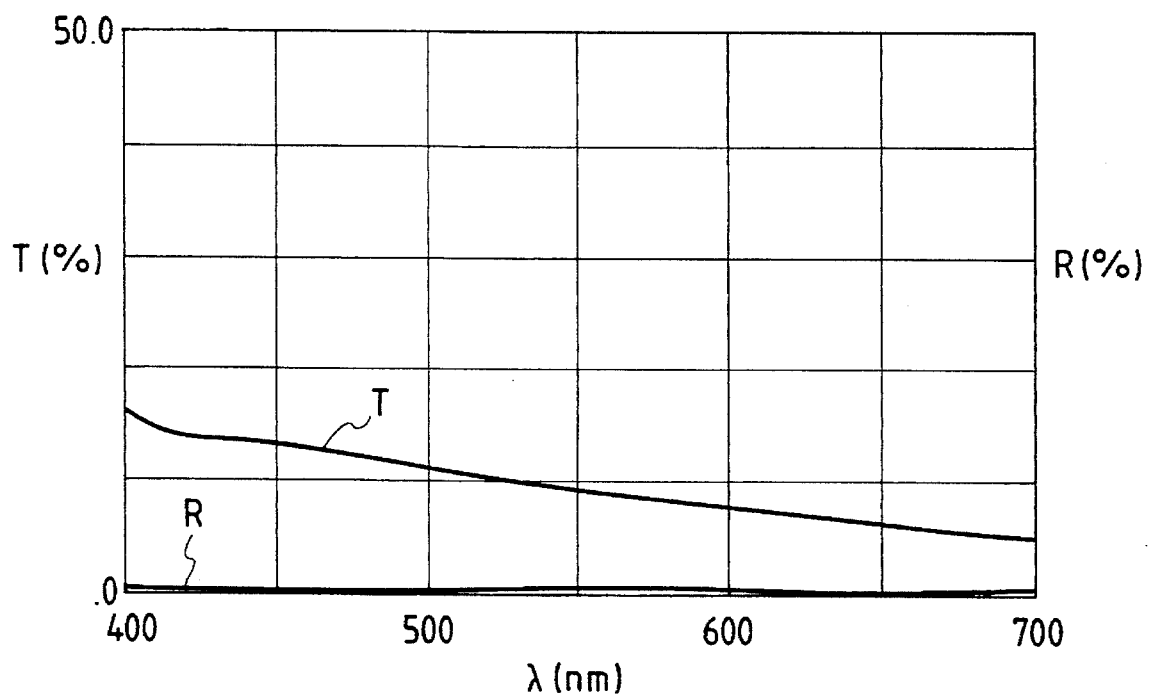

The spectral phase difference characteristic, as shown in FIG. 23, becomes nearly zero, and the characteristics of spectral transmittance (T) and spectral reflectance (R) are as shown in FIG. 24.

What is claimed is:

1. A multilayer film structure comprising:
   at least two light absorption layers; and
   at least two transparent layers;
   said absorption layers including at least one kind of metal, wherein a spectral phase difference between light transmitted through said multilayer film structure and light transmitted through other portion excluding said multilayer film structure is approximately 90° in the whole range of wavelength of visible light.

2. A multilayer film structure according to claim 1, wherein values of spectral absorption coefficients in substances of said light absorption layers are small on a short wavelength side and larger on a long wavelength side.

3. A multilayer film structure comprising;
   at least two light absorption layers; and
   at least two transparent layers;
   said absorption layers including at least one kind of metal, wherein a spectral phase difference between light transmitted through said multilayer film structure and light transmitted through other portion excluding said multilayer film structure is approximately 0° in the whole range of wavelength of visible light.

4. A multilayer film structure according to claim 1, wherein said multilayer film structure is composed of dielectric layers and metallic layers formed on a substrate, and wherein when the number of layers is taken as M and is even, one of $[(M/2)\pm n]$-th layers [where n= 0, 1, 2, ..., $\{(M/2)-2\}$] is made of $SiO_2$ and when the number of layers M is odd, one of $[\{(M+1)/2\}\pm n]$-th layers [where n=0, 1, 2, ..., $\{[(M+1)/2]-2\}$] is made of $SiO_2$.

5. A multilayer film structure according to claim 1 or claim 2, wherein said multilayer film structure is composed of dielectric layers and metallic layers formed on a substrate and at least one dielectric layer is made of cryolite.

6. A multilayer film structure according to claim 1 or claim 2, wherein one of said two transparent layers is provided between said two light absorption layers so that reflecting light from one of said two light absorption layers is offset by reflecting light from the other light absorption layer, and the other transparent layer has a function of adjusting the phase difference.

7. A multilayer film structure according to claim 6, wherein each of said light absorption layers includes one of Ni, Ti, Cr, Ag, Pt, Al, nickel-chrome, Inconel, and metal oxides.

8. A multilayer film structure according to claim 1 or claim 2, wherein one of a first layer and a last layer of said multilayer film structure is one of the transparent layers and a thickness of said one of said first or last layer satisfies a condition $$100 < d < 350 \text{ (nm)}$$

where d is thickness of said first or last layer.

9. A multilayer film structure according to claim 1 or 2, wherein a refractive index of each of said transparent layers satisfies a condition $$1.3 < n < 1.5$$

where n is the refractive index of each of said transparent layers.

10. A multilayer film structure according to claim 9, wherein each of said transparent layers includes one of $MgF_2$, $SiO_2$, and $Na_3AlF_6$.

11. A multilayer film structure according to claim 3, wherein one of said two transparent layers is provided between said two light absorption layers so that reflecting light from one of said two light absorption layers is offset by reflecting light from the other light absorption layer, and the other transparent layer has a function of adjusting the phase difference.

12. A multilayer film structure according to claim 11, wherein each of said light absorption layers includes one of Ni, Ti, Cr, Ag, Pt, Al, nickel-chrome, Inconel, and metal oxides.

13. A multilayer film structure according to claim 3, wherein one of a first layer and a last layer of said multilayer film structure is one of the transparent layers and a thickness of said one of said first or last layer satisfies a condition $$100 < d < 350 \text{ (nm)}$$

where d is thickness of said first or last layer.

14. A multilayer film structure according to claim 3, wherein a refractive index of each of said transparent layers satisfies a condition $$1.3 < n < 1.5$$

where n is the refractive index of each of said transparent layers.

15. A multilayer film structure according to claim 14, wherein each of said transparent layers includes one of $MgF_2$, $SiO_2$, and $Na_3AlF_6$.

* * * * *